United States Patent
Regensburger et al.

(10) Patent No.: US 11,300,521 B2
(45) Date of Patent: Apr. 12, 2022

(54) AUTOMATIC DEFECT CLASSIFICATION

(71) Applicant: Camtek Ltd., Migdal Haemeq (IL)

(72) Inventors: Menachem Regensburger, Shimshit (IL); Daniel Buzaglo, Migdal Haemeq (IL)

(73) Assignee: CAMTEK LTD., Migdal-Haemek (IL)

( * ) Notice: Subject to any disclaimer, the term of this patent is extended or adjusted under 35 U.S.C. 154(b) by 0 days.

(21) Appl. No.: 16/619,941

(22) PCT Filed: Jun. 14, 2018

(86) PCT No.: PCT/IB2018/054382
§ 371 (c)(1),
(2) Date: Dec. 6, 2019

(87) PCT Pub. No.: WO2018/229709
PCT Pub. Date: Dec. 20, 2018

(65) Prior Publication Data
US 2020/0141879 A1    May 7, 2020

Related U.S. Application Data

(60) Provisional application No. 62/519,516, filed on Jun. 14, 2017.

(51) Int. Cl.
*G01N 21/88* (2006.01)
*G01N 21/95* (2006.01)
*G06T 7/00* (2017.01)

(52) U.S. Cl.
CPC ..... *G01N 21/8851* (2013.01); *G01N 21/9501* (2013.01); *G06T 7/0004* (2013.01);
(Continued)

(58) Field of Classification Search
CPC ..... H01L 22/20; H01L 22/12; G01N 21/9505; G01N 21/8806; G01N 21/8851;
(Continued)

(56) References Cited

U.S. PATENT DOCUMENTS 5,172,421 A   12/1992  Nakamura
6,577,757 B1   6/2003  DeYong
(Continued)

FOREIGN PATENT DOCUMENTS

JP    2013/077127    4/2013
JP    2016183978    10/2016
(Continued)

*Primary Examiner* — Isiaka O Akanbi
(74) *Attorney, Agent, or Firm* — Reches Patents

(57) ABSTRACT

A method for automatic defect classification, the method may include (i) acquiring, by a first camera, at least one first image of at least one area of an object; (ii) processing the at least one first image to detect a group of suspected defects within the at least one area; (iii) performing a first classification process for initially classifying the group of suspected defects; (iii) determining whether a first subgroup of the suspected defects requires additional information from a second camera for a completion of a classification; (iv) when determining that the first subgroup of the suspected defects requires additional information from the second camera then: (a) acquiring second images, by the second camera, of the first subgroup of the suspected defects; and (b) performing a second classification process for classifying the first subgroup of suspected defects.

23 Claims, 10 Drawing Sheets

(52) U.S. Cl.
CPC ............... *G01N 2021/8867* (2013.01); *G01N 2021/8887* (2013.01); *G06T 2207/30148* (2013.01)

(58) Field of Classification Search
CPC ....... G01N 21/9501; G01N 2021/8867; G01N 21/95607; G01N 21/956; G01N 2021/8887; G06T 7/0004; G06T 2207/30148
USPC ................ 356/237.2–237.6; 382/149, 141
See application file for complete search history.

(56) References Cited

U.S. PATENT DOCUMENTS

| | | |
|---|---|---|
| 6,697,516 B1 | 2/2004 | Alexandre |
| 2004/0028276 A1* | 2/2004 | Okuda .................... G06T 7/001 382/224 |
| 2004/0233422 A1 | 11/2004 | Weineke |
| 2007/0133860 A1* | 6/2007 | Lin .......................... G06T 7/001 382/149 |
| 2007/0133862 A1 | 6/2007 | Gold |
| 2011/0164806 A1 | 7/2011 | Peleg |
| 2012/0027287 A1* | 2/2012 | Fang ....................... G06T 7/001 382/149 |
| 2012/0057773 A1* | 3/2012 | Langmatz ............... G06T 7/001 382/141 |
| 2012/0195490 A1 | 8/2012 | Langmans |
| 2012/0229618 A1* | 9/2012 | Urano ................... G06T 7/0004 348/92 |
| 2015/0098655 A1 | 4/2015 | Chang |
| 2016/0358041 A1* | 12/2016 | Venkataraman ........ H01L 22/00 |
| 2017/0094141 A1 | 3/2017 | Hicks |
| 2017/0099435 A1 | 4/2017 | Chen et al. |

FOREIGN PATENT DOCUMENTS

| | | |
|---|---|---|
| WO | 2014/117870 | 8/2014 |
| WO | 2016/121628 | 8/2016 |

* cited by examiner

Size > $x_1$
Dist. From Bump = 0

Size > $x_2$
Dist. From Bump < Bump Diameter * 0.25

Size > $x_3$
Not Dust

Size > $x_4$
Not Dust

| Decision | Dist From Bump (D) | Size (S) | Average GL | Additional Data? |
|---|---|---|---|---|
| No Defect | Any | $S < X_1$-Resolution | Any | No |
| Suspected defect | $D=0$ | $X_1$-Resolution $< S < X_1$+Resolution | Any | Yes |
| Suspected defect | $D <$ Resolution | $S > X_1$+Resolution | Any | Yes |
| Defect | $D >$ Resolution | $S > X_1$+Resolution | Any | No |
| No Defect | $0 > D > Diameter * 0.25$ | $S < X_2$-Resolution | Any | No |
| Suspected defect | $0 > D > Diameter * 0.25$ | $X_2$-Resolution $< S < X_2$+Resolution | Any | Yes |
| Defect | $0 > D > Diameter * 0.25$ | $S > X_2$+Resolution | Any | No |
| No Defect | $D > Diameter * 0.25$ | $S < X_3$-Resolution | Any | No |
| Suspected defect | $D > Diameter * 0.25$ | $X_3$-Resolution $< S < X_3$+Resolution | Any | Yes |
| No Defect (Dust) | $D > Diameter * 0.25$ | $X_3$+Resolution $< S < X_4$-Resolution | GL $<$ Dust GL | No |
| Defect | $D > Diameter * 0.25$ | $X_3$+Resolution $< S < X_4$-Resolution | GL $>$ Dust GL | No |
| Suspected defect | $D > Diameter * 0.25$ | $X_4$-Resolution $< S < X_4$+Resolution | Any | Yes |
| Defect | $D > Diameter * 0.25$ | $S > X_4$+Resolution | Any | No |

FIG. 10

AUTOMATIC DEFECT CLASSIFICATION

CROSS REFERENCE

This application claims priority from US provisional patent Ser. No. 62/519,516 filing date Jun. 14, 2017.

BACKGROUND OF THE INVENTION

For every industry a high yield is a pivot for maintaining competitiveness, not least in the highly developed microelectronics industry. Every yield fraction can have a dramatic influence on the ability to earn or lose during the production phase.

In order to maintain and constantly improve its yield, a factory would have to invest in inspection for both QA (quality assurance) purposes (which die is good and which ones are bad) and process control.

An efficient process control system could recognize an abnormality in an early stage and so prevent a deterioration and enable the engineering staff to perform a corrective action.

The quicker the corrective action is, the less loss would it be for the factory.

SUMMARY

There may be provided a method for automatic defect classification, the method may include (i) acquiring, by a first camera, at least one first image of at least one area of an object; (ii) processing the at least one first image to detect a group of suspected defects within the at least one area; (iii) performing a first classification process for initially classifying the group of suspected defects; (iii) determining whether a first subgroup of the suspected defects requires additional information from a second camera for a completion of a classification; (iv) when determining that the first subgroup of the suspected defects requires additional information from the second camera then: (a) acquiring second images, by the second camera, of the first subgroup of the suspected defects; and (b) performing a second classification process for classifying the first subgroup of suspected defects.

BRIEF DESCRIPTION OF THE INVENTION

The present invention will be understood and appreciated more fully from the following detailed description taken in conjunction with the drawings:

FIG. 1 illustrates an example of a method;
FIG. 2 illustrates an example of a system;
FIG. 3 illustrates an example of a system;
FIG. 4 illustrates an example of a system;
FIG. 5 illustrates an example of a generation of a reference image;
FIG. 6 illustrates an example of a defect detection process;
FIG. 7 illustrates a top view of a bump and its surroundings, and a gray level distribution of pixels along an imaginary line;
FIG. 8 illustrates an image of a bump and its surroundings and of various processing steps for extracting parameters of the bump;
FIG. 9 illustrates examples of different recipe rules; and
FIG. 10 illustrates various determination rules.

DETAILED DESCRIPTION OF THE INVENTION

Because the apparatus implementing the present invention is, for the most part, composed of optical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Inspection machines can check for a variety of defects and abnormalities. However, in order to have a clear cause and effect, a classification of the abnormalities (defects) is required.

For example, a defect can be caused by a defective CMP process, an etching or contamination issues. A defect classification process can distinguish between the different defects.

While a manual classification process can be performed, it is both slow and costly.

An Automatic Defect Classification (ADC) can work cheaply and quickly. In the last few years, some major advancements in the machine learning technology, enabled to achieve very good results using ADC systems.

However, in many cases, the data that is used during scanning is insufficient for the clear separation between different kinds of defects. For instance, when a color difference appears—if it is red—it may be a copper layer, however if it is black it may be just a foreign material.

But, getting this additional data after the detection process, costs time and resources.

There may be provided a method that may include:
a. Loading the wafer on the chuck.
b. Acquiring by the first camera (such as a high performance scanning camera—may be a black and white camera) images of the wafer and send it to the computer for processing. This may include scanning the wafer with a main acquisition module (scanner module) (continuous, usually with superior rate but reduces sensitivity with respect to the second camera).
c. Using a predefined set of detection processes, defect are located and stored in the computer.
d. A first classification process assigns an initial class to the defect.
e. After the end of the inspection process, the defects are loaded again (are fed to the computer—especially to a decision circuit of the computer). For each defect, based on a predefined rule (or based on any other decision process), the system automatically determines if an additional data is required.
f. If so, the defect location is brought within the field of view of a second camera (a verification camera) such as the color camera (can be a 3d profiler, an IR camera, a NIR camera, or a high magnification microscope) and the additional data about the defect is acquired.
g. Based on the full data, a final classification is performed for the defects and a final class is attached to the defect.
h. The data is then stored (reported if necessary) and the wafer can be unloaded from the system.

This process enables a fabrication plant (FAB) to enjoy the high speed of the inspection system combined with the high resolution and detailed information of the verification system. The selective application of the verification system (only to those defects that require additional data) speeds up the entire process.

The combination of the two (or more) classification phases enables, while using the same loading/unloading mechanism, to optimize the time of the wafer processing and end up with a final comprehensive data of the wafer status.

This in turn enables a quick and effective measures to be performed in case of a fault in the previous steps.

FIG. 1 illustrates a method 900 for automatic defect classification, the method may include:

Step 904 of loading a wafer. The wafer may be loaded on a chuck.

Step 904 may be followed by step 905 of maintaining the wafer on the chuck until the completion of steps 908, 910, 912, 914 and 916.

Step 905 is followed by step 907 of unloading the wafer.

The method may also include step 906 of acquiring, by a first camera, at least one first image of at least one area of an object. The at least one area may span along the entire object or may include only one or more parts of the object.

Step 906 may be followed by step 908 of processing the at least one first image to detect a group of suspected defects within the at least one area.

Step 908 may be followed by step 910 of performing a first classification process for initially classifying the group of suspected defects.

Step 910 may be followed by step 912 of determining whether a first subgroup of the suspected defects requires additional information from a second camera for a completion of a classification.

Step 912 may be executed without human intervention. The determining may be responsive to at least one of the following:

a. A difference between image acquisition parameters of the first camera and second camera. These image acquisition parameters may include frequency (visible light versus IR, NIR, color versus black and white, narrowband versus wide band), resolution, throughput, and the like.

b. A criticality and/or importance of the suspected defects. More critical defects (such as killer defects that may render a circuit inoperable) may be examined with more resources.

c. An accuracy of the first classification process.

d. A difference between a reliability of the first classification process and a reliability, of the second classification process. The reliability may be reflected by a success rate, a false alarm rate, false positive rate, and the like.

e. A type of the defect. The type of the defect may be taken in account in combination of all other factors mentioned above. For example—if a certain defect can be detected in a more reliable manner when using IR radiation—then the reliability of a classification process that uses an IR camera is higher than a classification process that uses a black and white camera.

Step 912 may include calculating a cost function that will take into account one of more benefits of the execution of step 914 (for example—more reliable classification process), one or more merits of the execution of step 914 (for example—higher time consumption), and may also take into account parameters related to limitations (such as resolution) of the first camera, throughput considerations, and the like.

If the answer of step 912 is negative, then step 912 is followed by step 916.

If the answer of step 912 is positive, then step 912 is followed by step 914.

Step 914 includes:

a. Acquiring second images, by the second camera, of the first subgroup of the suspected defects.

b. Performing a second classification process for classifying the first subgroup of suspected defects.

Step 914 may include acquiring the second images without acquiring images of suspected defects that do not belong to the first subgroup of suspected defects.

Step 914 may be followed by step 916 by providing classification results. This may include storing the classification results, communicating the classification results to another system, and the like.

Steps 908, 910, 912 and the second classification process may be executed by the same computer, by the same processor, by different computers, by different processors, by the inspection and verification system, by one or more computers located outside the inspection and verification systems.

The Combined ADC

The combined ADC system generates an effective ADC process while optimizing the resources to minimize the analysis time of the wafer.

The combined system may include:

a. A wafer handling system for loading/unloading a wafer.

b. An inspection module for full/partial wafer inspection. The inspection module includes a first camera (such as an inspection camera).

c. An additional data acquisition component. For example—a Color Camera, infrared (IR) Camera or 3D profiler.

d. A computer (also referred to as processor) for data analysis.

e. Data storage for results.

The throughput of the first camera may exceed a throughput of the second camera. For example—by a factor of 2, 3, 4, 5, 6 and even more.

The resolution of the first camera may be coarser than resolution of the second camera. For example—by a factor of 2, 3, 4, 5, 6 and even more.

The first camera may differ from the second camera by one or more image acquisition parameter—such as frequency (visible light versus IR, NIR, color versus black and white, narrowband versus wide band), resolution, throughput, dark field versus bright field, and the like.

The first camera may be a black and white camera and the second camera is selected out of an infrared camera, a near infrared camera and a three dimension profiler.

FIG. 2 illustrates an object (such as wafer 90) and a system 101 that includes:

a. Storage unit 190.

b. Computer 180.

c. Color illumination 173 for illuminating the object with radiation that may be reflected and/or scattered and detected by the color camera 172—the term "color" in relation to the illumination merely links the illumination to the color camera.

d. Color camera 172.

e. Color optics 171 that precede color camera 172.

f. Inspection illumination 163 for illuminating the object with radiation that may be reflected and/or scattered and detected by the inspection camera 162.

g. Inspection camera 162.

h. Inspection optics 161 that precede inspection camera 162.
i. Chuck 150.
j. Stage 140 for moving the chuck (and hence moving the object).
k. Wafer handling system 130. It may include a robots for fetching a wafer from a cassette (or other interface) and place it on chuck 150.

The computer 180 includes one or more hardware processing circuits (such as one or more processors) that may perform image processing, defect detection, classification and may determine whether an additional classification is required.

Each optics out of color optics 171 and inspection optics 161 may include at least one out of lenses, apertures, beam splitters, polarizers, collimators, scanners, and the like.

These optics (color optics 171 and inspection optics 161) may be used in a collection path and/or in an illumination path. Thus—these optics may be used to manipulate/direct/control/affect radiation from color illumination 173 and/or inspection illumination 163.

Color optics 171 and inspection optics 161 may share one or more optical component, may not share any optical component, may be combined to a single optics unit, and the like.

Color illumination 173 and inspection illumination 163 may share one or more optical component, may not share any optical component, may be combined to a single illumination unit, and the like.

Data/images acquired before each one of the classification phases may involve introducing movement between the object and the relevant camera and/or relevant optics and/or the relevant illumination. The movement can be done by the stage 140 and/or by a movement mechanism (such as a scanner) that moves the relevant camera and/or relevant optics and/or the relevant illumination.

The acquiring, by the inspection camera, at least one first image of at least one area of an object may include scanning the one or more areas using a first scan pattern.

The acquiring of second images, by the color camera, of a first subgroup of the suspected defects may include introducing movement (moving between one defect to another)—so that the suspected defects of the first subgroup are within the field of view of the color camera—one or more suspected defects at a time.

FIG. 3 illustrates an example a system 102. System 102 differs from system 101 by the following:
a. System 102 includes first camera 821 and second camera 822 which may differ from the color camera and the inspection camera of system 101.
b. System 102 includes first illumination 211 and second illumination 212 that may differ from color illumination 173 and inspection illumination 163.
c. System 102 includes a shared optic 210 that precedes these cameras. It should be noted that first and second optics may precede first and second cameras.

It should be noted that the system may include more than two cameras that differ from each other. Thus—there may be more than two classification sessions. Additionally or alternatively, any classification phase may be preceded by selecting which camera will be used to acquire data to be used during that classification. The defect detection that precedes the initial classification may also be preceded by selecting which camera will be used to acquire the images to be processed during the defect detection phase.

FIG. 4 illustrates an example a system 103. System 103 differs from system 102 by the following:

a. System 103 includes more than two cameras—first till N'th cameras (for example first camera 821 and N'th camera 828)—where N exceeds two.

FIG. 4 also provide more details—it (a) illustrates a scanner 125 for moving one or more cameras, (b) illustrates a controller 120 for controlling the system, and (c) illustrates computer 180 as including classifier 182, and defect detector 181. The controller 120 and/or the scanner 125 and or defect detector 181 and/or the classifier 182 may be includes in system 101 and system 102.

The classifier 182 is a processing circuit that is programmed and/or constructed and arrange to perform one or more classification processes.

The defect detector 181 is a processing circuit that is programmed and/or constructed and arrange to perform one or more defect detection processes.

FIGS. 5-10 illustrate a non-limiting example of decision rules that dictate when an additional data is required. These figures illustrates how a reference image is generated, how first images are processed and then illustrates some recipe rules for defining a defect, and then show when additional data is required.

FIG. 5 illustrates an example of a generation of a reference image.

Out of wafer 200 some dies are selected. The selection can be done in any manner.

A reference die is generated based on the properties of pixels in the images 201, 202, 203 and 204 of the selected dies. The properties (for example—minimum value, maximal value and nominal value) of each pixel are based on the values (gray level values) of corresponding pixels within the images of dies 201-204—after the images are aligned.

Indexes i and j represent the row and column of each pixel.
a. The minimal value of the (i,j)th pixel of the reference image equals the minimal gray level value out of the values of the (i,j)th pixels of the images of dies 201-204.
b. The maximal value of the (i,j)th pixel of the reference image equals the maximal gray level value out of the values of the (i,j)th pixels of the images of dies 201-204.
c. The nominal value of the (i,j)th pixel of the reference image equals the medial gray level value out of the values of the (i,j)th pixels of the images of dies 201-204.

Figure 1:
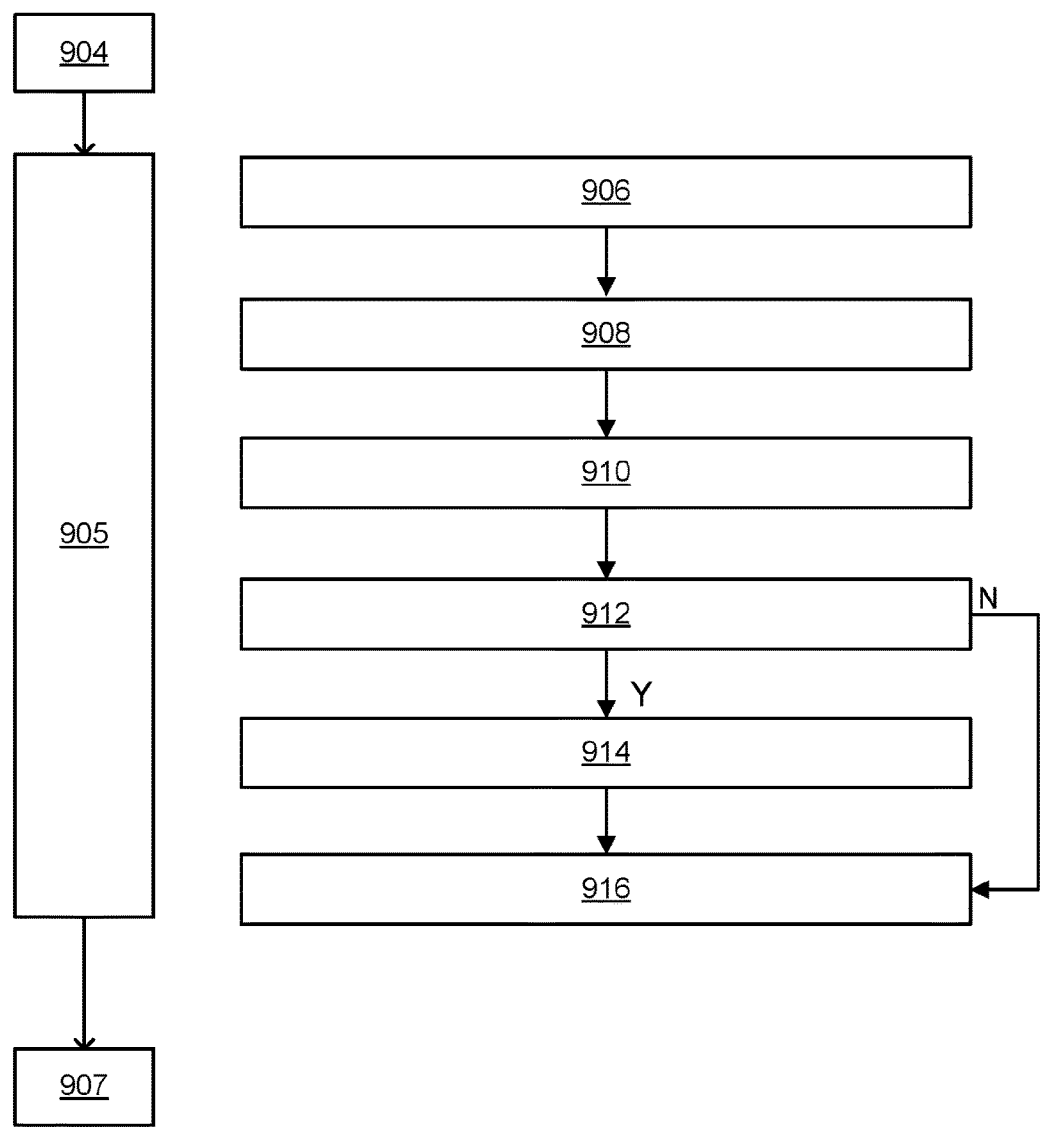
Figure 2:
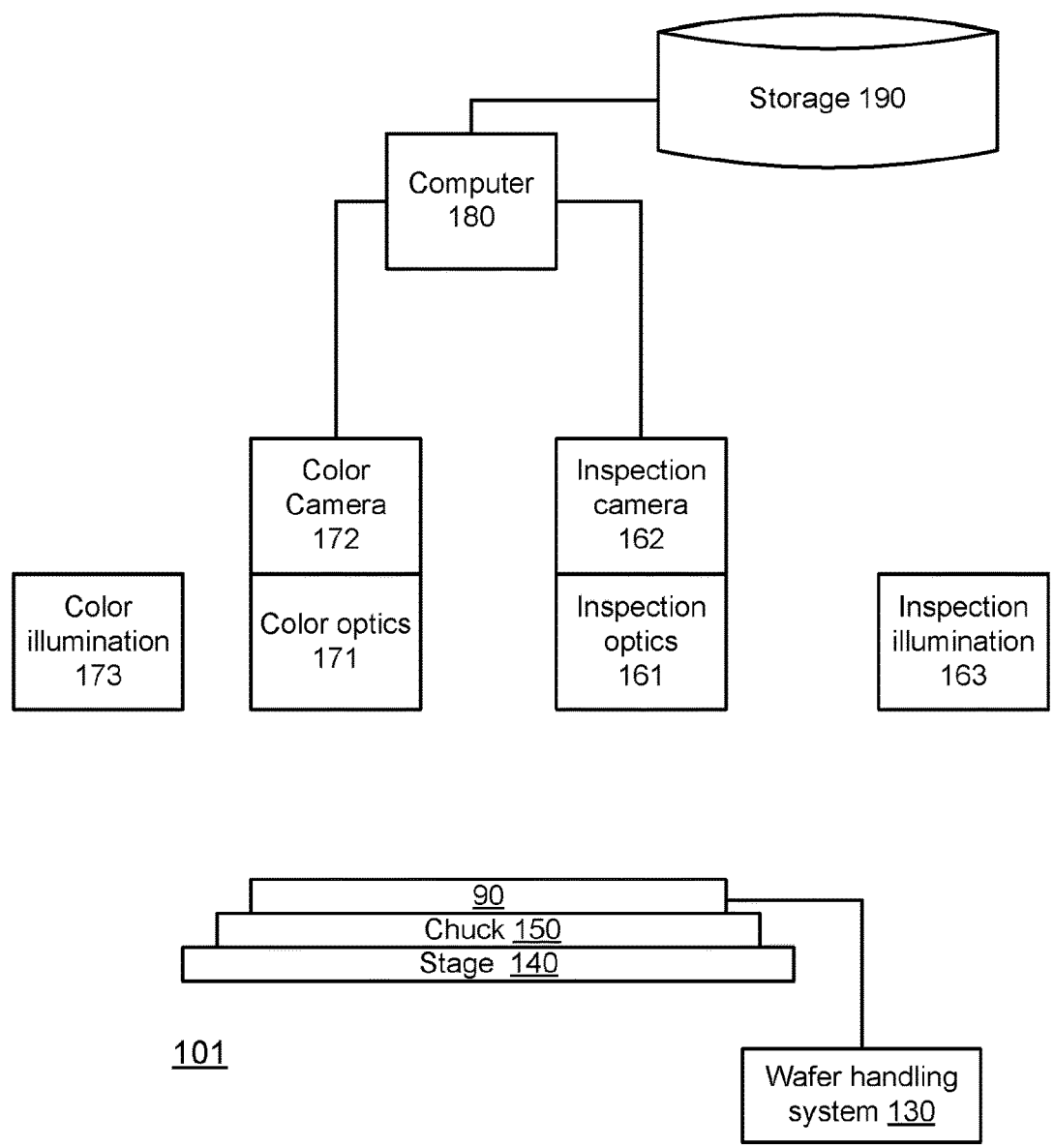
Figure 3:
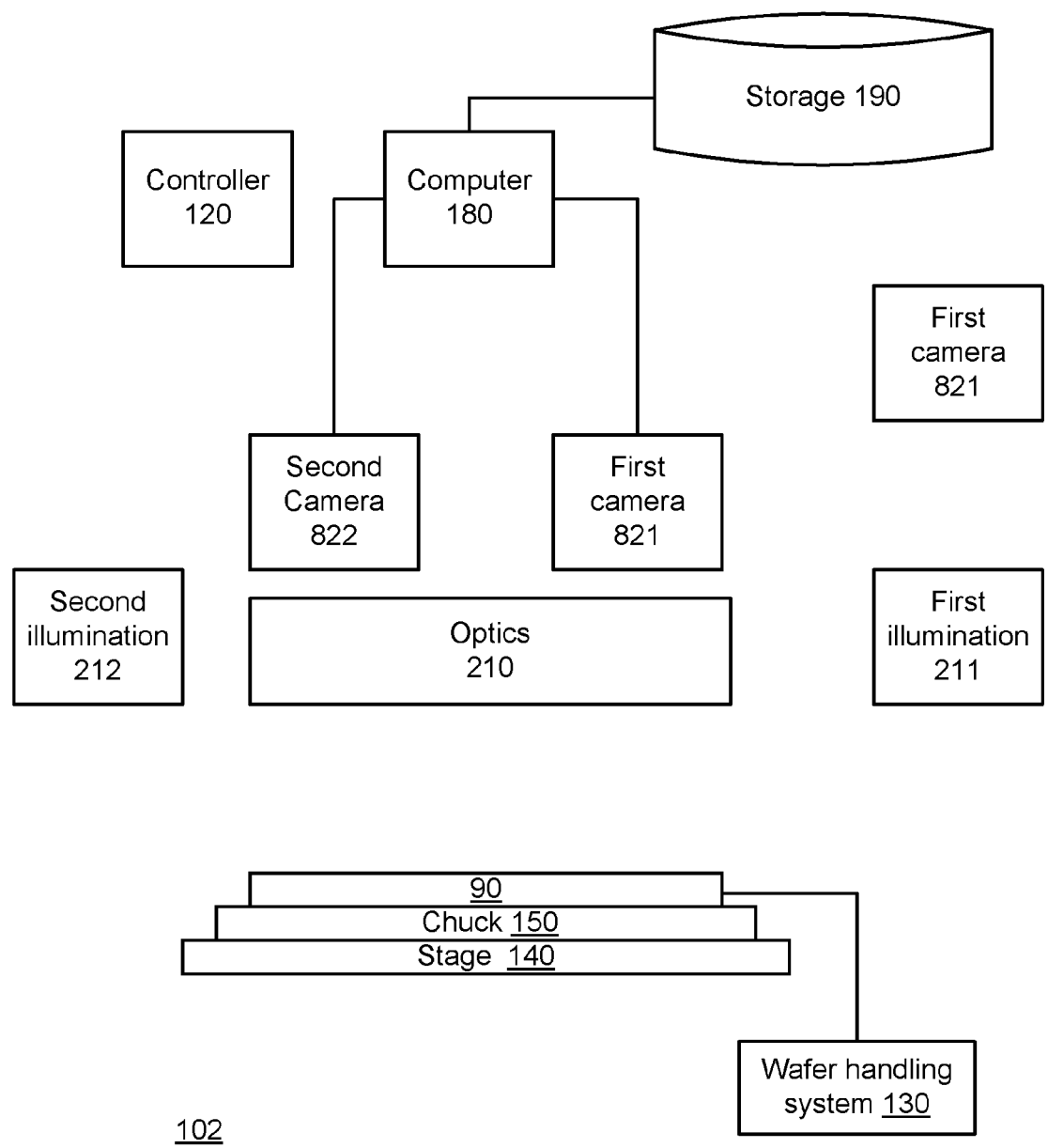
Figure 4:
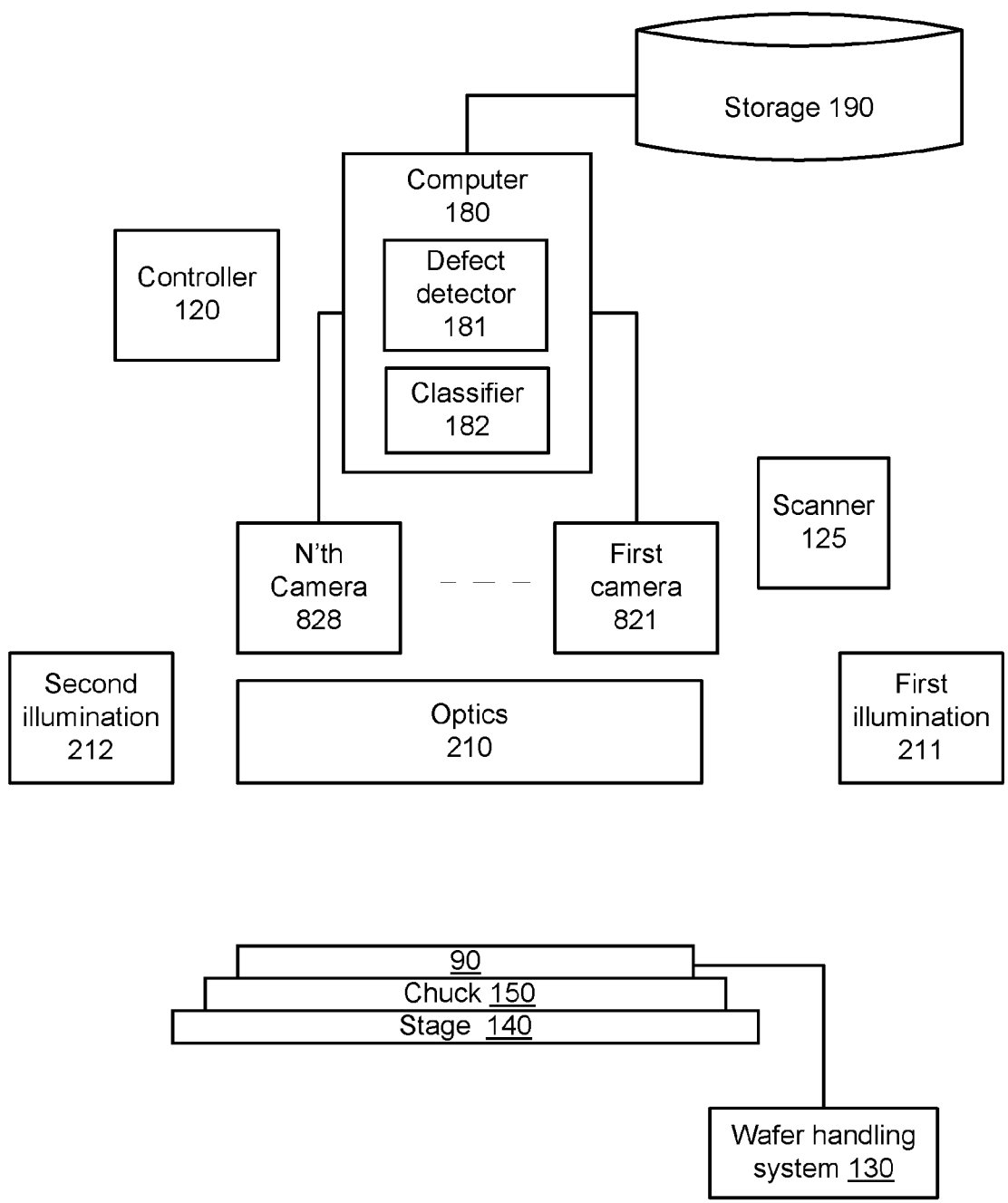
Figure 5:
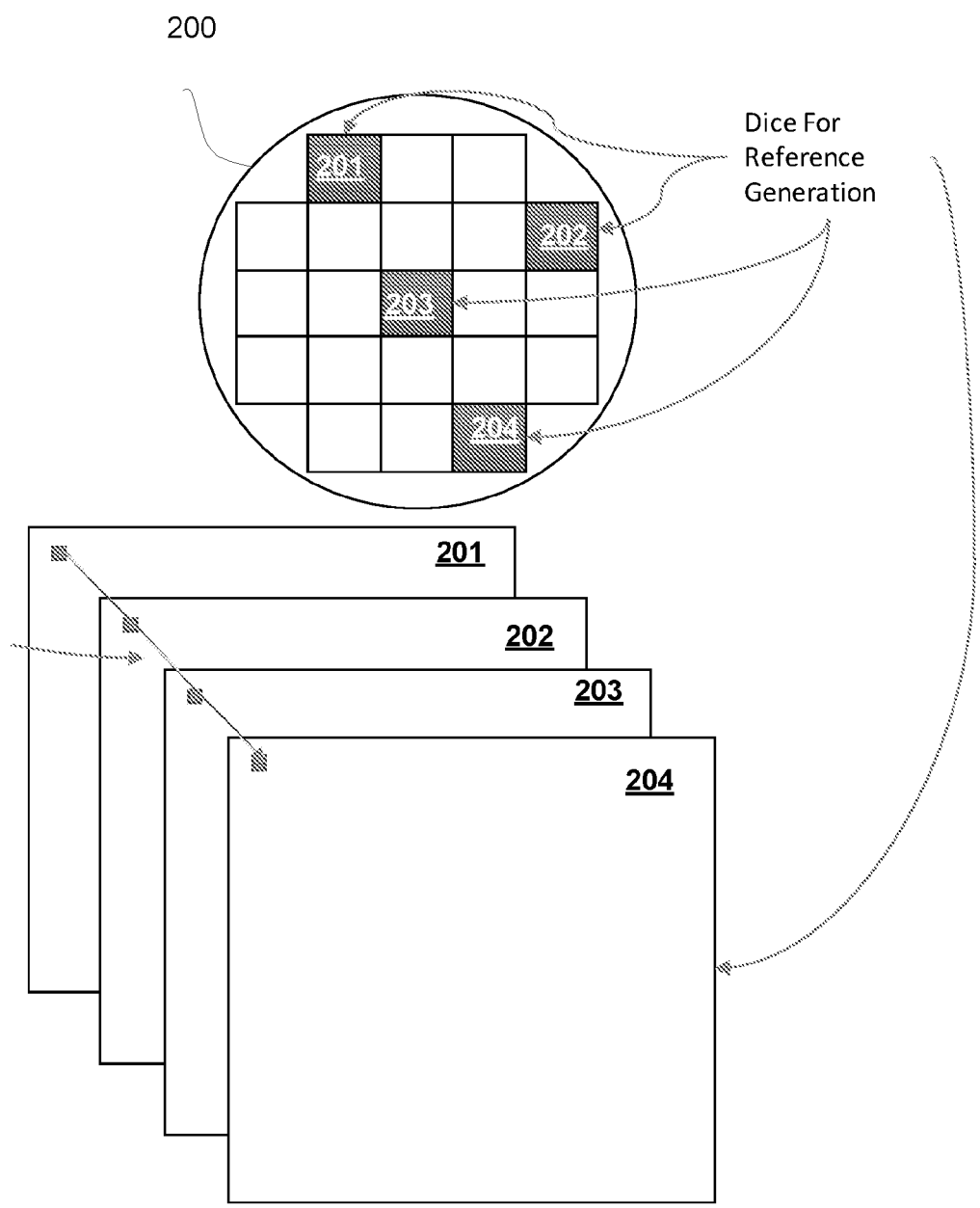
Figure 6:
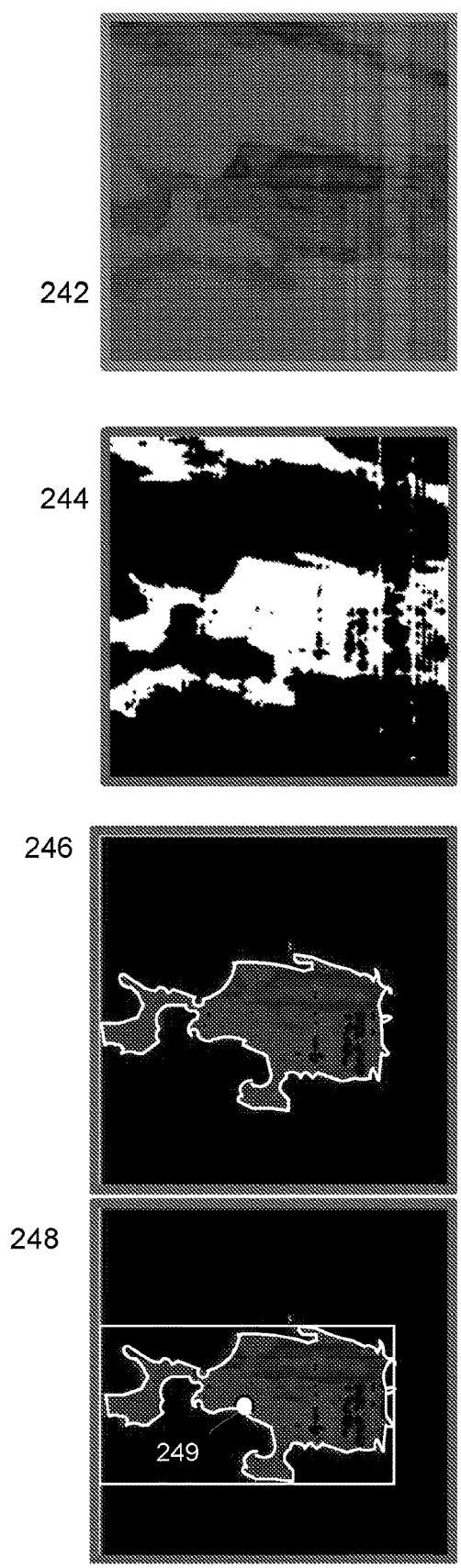
Figure 6:
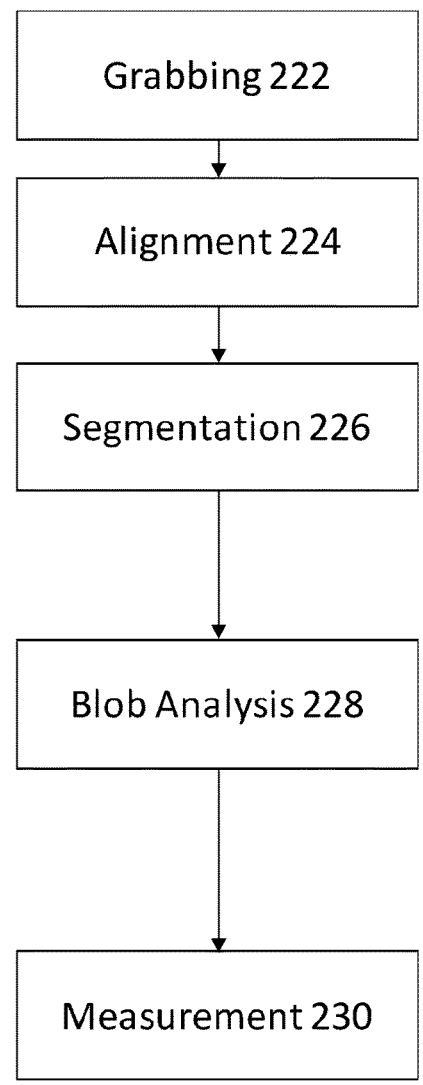

FIG. 6 illustrates an example of a defect detection process.

The defect detection process includes:
a. Grabbing 222—acquiring an image of an area of an object—see image 242.
b. Alignment 224—aligning the acquired image and the reference image.
c. Segmentation 226—the defect detection process marks locations (pixels) that may represent (or may be included in) suspected defects—in image 244 these pixels are white.
d. Blob analysis 228—attempting to group suspected defect pixels that are connected to each other—form a continuous arrangement of suspected defect pixels. In image 246 a while line represents the edge of a blob that is formed by suspected defect pixels.
e. Measurement 230—measuring one or more properties of the blob. For example, assuming that the blob includes M pixels (B1 . . . BM) then the following attributes may be measured:
i. Defect area–number of pixels (M).

ii. Defect average deviation from reference=Sum(Bi,j−Ri,j)/M, wherein Bi,j belongs to B1 . . . BM, whereas (i,j) is the location of the pixel within the acquired image, and Ri,j if the (i,j)th pixel of the reference image.

iii. Defect position is the center of mass 249 of the blob (see image 248).

Any other defect analysis can be used.

Figure 7:
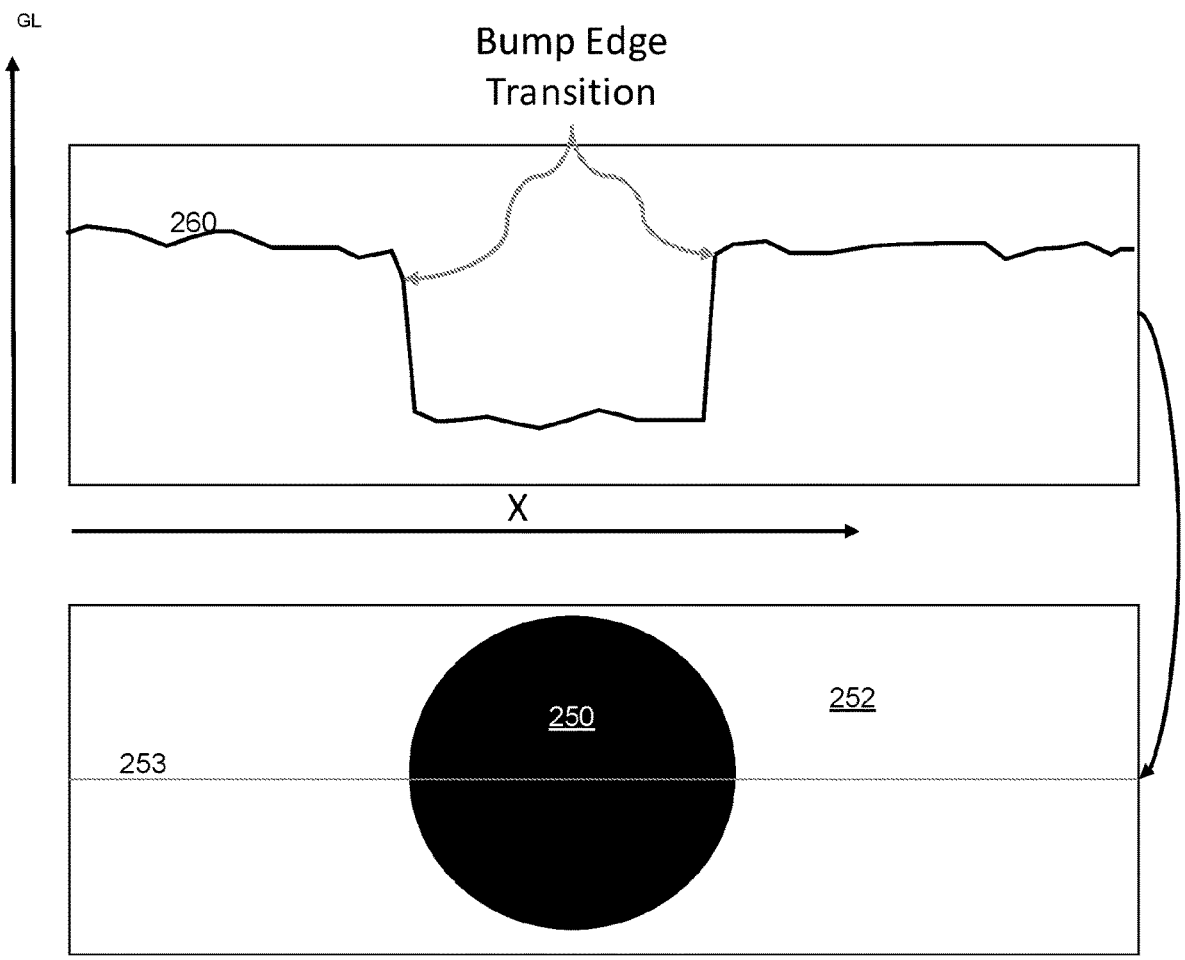

FIG. 7 illustrates a top view of a bump 250 and its surroundings 252, and a gray level distribution 260 of pixels along an imaginary line 253 that passes through the bump and its surroundings.

Figure 8:
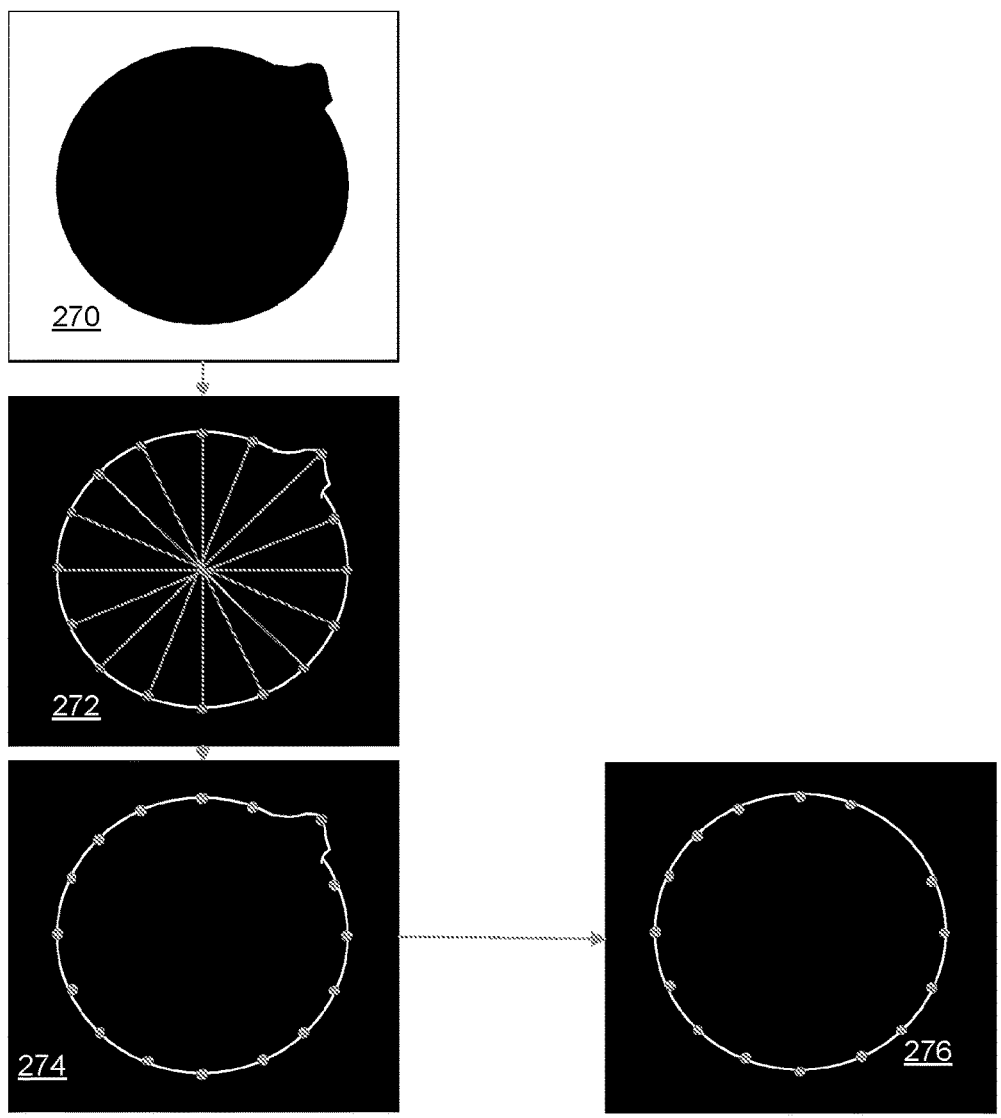

FIG. 8 illustrates an image of a bump and its surroundings and of various processing steps for extracting parameters of the bump.

Image 270 of the image of the bump and its surroundings.

The image is processed (steps 272 and 274) by sampling the edges of the bump at different locations (at different angles—at intersections between the edge and lines that extend from a common point).

Ignoring a sample that differs from other samples by a predefined amount to provide an estimate of the bump—reconstructed bump circle (276).

Figure 9:
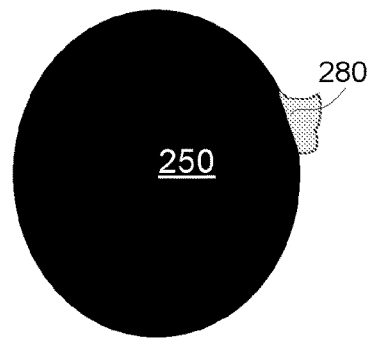
Figure 9:
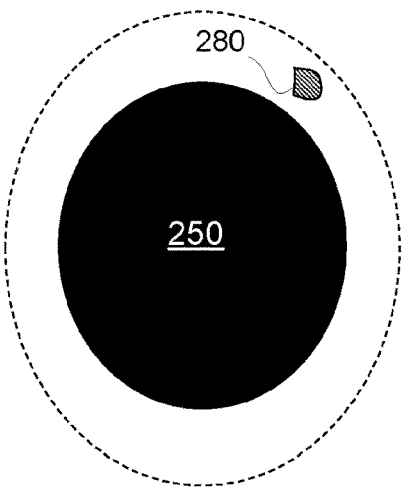
Figure 9:
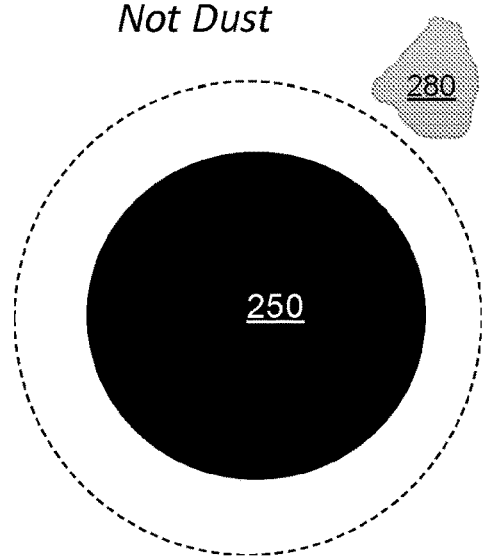
Figure 9:
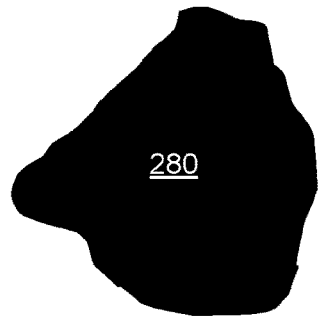

FIG. 9 illustrates examples of different recipe rules.

In this example size x1 is smaller than x2 that is smaller than x3 that is smaller than x4: x1<x2<x3<x4.

The different recipe rules are used to classify defects.

These rules define a defect if:
a. The defect (280) contacts the bump (250) (distance from bump is zero) and the defect size exceeds x1.
b. The distance between the defect and the bump does not exceed 0.25 of the diameter of the bump and the defect size exceeds x2.
c. The defect is not dust, the distance between the defect and the bump exceeds 0.25 of the diameter of the bump and the defect size exceeds x3.
d. The defect is not dust and the defect size exceeds x4.

FIG. 10 illustrates various determination rules.

These determination rules are arrange in table 300.

Table 300 includes five columns—decision (defect, no defect, suspected defect), distance from bump, size of defect, average gray level (used to differentiate dust—as dust has a unique GL—usually the darkest GL), and additional data? (indicates if additional data is required—whether the suspected defect belongs to a first subgroup of suspected defects—that require an additional classification process).

Table 300 includes a term "resolution" which is the resolution of the first camera. The resolution introduced an uncertainty—as the accuracy of distance measurements and/or size measurements are limited by the resolution.

A processing of a first image acquired by a first camera introduces an uncertainty (of Resolution) regarding whether the defect contacts the bump and regarding the size of the defect.

For example, referring to the second rule listed in the table—if the first image indicates that the defect contacts the bump and the size of the defect ranges between (x1-Resolution) and (x1+Resolution)—then the defect is a suspected defect and more information should be acquired—for example by using a finer resolution camera, using a color camera that may determine with more certainty whether the defect touches the bump, and the like.

For example, referring to the third rule listed in the table—if the first image indicates that the distance between the defect and the bump is lower than Resolution and the size of the defect exceeds x1+Resolution—then the defect is a suspected defect and more information should be acquired—for example by using a finer resolution camera, using a color camera that may determine with more certainty whether the defect touches the bump, and the like.

In the table—decisions of a "defect" or "no defect" are an outcome of the first classification process, and decisions "suspected defect" are indicative of suspected defects (of a first subgroup of suspected defects) that require an acquisition of second images and an additional classification process.

The terms "first camera", "inspection camera", "black and white camera" are used in an interchangeable manner.

The terms "second camera", "verification camera", "color camera" are used in an interchangeable manner.

The terms processor and computer are used in an interchangeable manner.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer program product that stores instructions that once executed by a computer result in the execution of the method. The non-transitory computer program product may be a chip, a memory unit, a disk, a compact disk, a non-volatile memory, a volatile memory, a magnetic memory, a memristor, an optical storage unit, and the like.

Any reference in the specification to a system should be applied mutatis mutandis to a method that can be executed by the system and should be applied mutatis mutandis to a non-transitory computer program product that stores instructions that once executed by a computer result in the execution of the method.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

We claim:

1. A method for automatic defect classification, the method comprises:
    acquiring, by a first camera, at least one first image of at least one area of an object;
    processing the at least one first image to detect a group of suspected defects within the at least one area;
    performing a first classification process for initially classifying the group of suspected defects;
    determining whether a first subgroup of the suspected defects requires additional information from a second camera for a completion of a classification;
    wherein the determining is responsive to:
    (a) a criticality of the suspected defects;
    (b) an accuracy of the first classification process; and
    (c) difference between a reliability, related to a type of suspected defect, of the first classification process and a reliability, related to a type of suspected defect, of the second classification process; wherein the reliability is reflected by a success rate, a false alarm rate and false positive rate;
    when determining that the first subgroup of the suspected defects requires additional information from the second camera then:
        acquiring second images, by the second camera, of the first subgroup of the suspected defects; and
        performing a second classification process for classifying the first subgroup of suspected defects.

2. The method according to claim 1 comprising acquiring the second images without acquiring images of suspected defects that do not belong to the first subgroup of suspected defects.

3. The method according to claim 1 wherein a throughput of the first camera exceeds a throughput of the second camera.

4. The method according to claim 1 wherein a resolution of the first camera is coarser than resolution of the second camera.

5. The method according to claim 1 wherein the first camera is a black and white camera and the second camera is selected out of an infrared camera, a near infrared camera and a three dimension profiler.

6. The method according to claim 1 comprising maintaining the wafer on a chuck during the acquiring of the at least one first image, during the acquiring of the second images, and between the acquiring of the at least one first image and the acquiring of the second images.

7. The method according to claim 1 wherein the determining is responsive to a difference between image acquisition parameters of the first camera and second camera.

8. The method according to claim 1 wherein the determining is responsive to the criticality of the suspected defects.

9. The method according to claim 1 wherein the determining is responsive to the accuracy of the first classification process.

10. The method according to claim 1 wherein the determining is executed without human intervention.

11. The method according to claim 1 wherein the determining is responsive to the difference between the reliability, related to the type of suspected defect, of the first classification process and a reliability, related to the type of suspected defect, of the second classification process.

12. A non-transitory computer program product that stores instructions that once executed by a computerized system cause the computerized system to execute the steps of:
    acquiring, by a first camera, at least one first image of at least one area of an object;
    processing the at least one first image to detect a group of suspected defects within the at least one area;
    performing a first classification process for initially classifying the group of suspected defects;

determining whether a first subgroup of the suspected defects requires additional information from a second camera for a completion of a classification;

wherein the determining is responsive to:

(a) a criticality of the suspected defects;

(b) an accuracy of the first classification process; and (c) difference between a reliability, related to a type of suspected defect, of the first classification process and a reliability, related to a type of suspected defect, of the second classification process; wherein the reliability is reflected by a success rate, a false alarm rate and false positive rate;

when determining that the first subgroup of the suspected defects requires additional information from the second camera then:

acquiring second images, by the second camera, of the first subgroup of the suspected defects; and performing a second classification process for classifying the first subgroup of suspected defects.

13. The non-transitory computer readable medium according to claim 12 that stores instructions for acquiring the second images without acquiring images of suspected defects that do not belong to the first subgroup of suspected defects.

14. The non-transitory computer readable medium according to claim 12 wherein a throughput of the first camera exceeds a throughput of the second camera.

15. The non-transitory computer readable medium according to claim 12 wherein a resolution of the first camera is coarser than resolution of the second camera.

16. The non-transitory computer readable medium according to claim 12 wherein the first camera is a black and white camera and the second camera is selected out of an infrared camera, a near infrared camera and a three dimension profiler.

17. The non-transitory computer readable medium according to claim 12 that stores instructions for maintaining the wafer on a chuck during the acquiring of the at least one first image, during the acquiring of the second images, and between the acquiring of the at least one first image and the acquiring of the second images.

18. The non-transitory computer readable medium according to claim 12 wherein the determining is responsive to a difference between image acquisition parameters of the first camera and second camera.

19. The non-transitory computer readable medium according to claim 12 wherein the determining is responsive to a criticality of the suspected defects.

20. The non-transitory computer readable medium according to claim 12 wherein the determining is responsive to an accuracy of the first classification process.

21. The non-transitory computer readable medium according to claim 12 wherein the determining is executed without human intervention.

22. The non-transitory computer readable medium according to claim 12 wherein the determining is responsive to difference between a reliability, related to a type of suspected defect, of the first classification process and a reliability, related to a type of suspected defect, of the second classification process.

23. A system for automatic defect classification, the system comprises:

a first camera that is constructed and arranged to acquire at least one first image of at least one area of an object;

a second camera;

at least one processor that is constructed and arranged to (i) process the at least one first image to detect a group of suspected defects within the at least one area; (ii) perform a first classification process for initially classifying the group of suspected defects; and (iii) determine whether a first subgroup of the suspected defects requires additional information from a second camera for a completion of a classification;

wherein the determining is responsive to:

(a) a criticality of the suspected defects;

(b) an accuracy of the first classification process;

(c) difference between a reliability, related to a type of suspected defect, of the first classification process and a reliability, related to a type of suspected defect, of the second classification process; wherein the reliability is reflected by a success rate, a false alarm rate and false positive rate;

when determining that the first subgroup of the suspected defects requires additional information from the second camera then:

acquiring second images, by the second camera, of the first subgroup of the suspected defects; and performing a second classification process for classifying the first subgroup of suspected defects.

* * * * *